United States Patent [19]

Béguin et al.

[11] 4,099,965

[45] Jul. 11, 1978

[54] METHOD OF USING MgCl$_2$-KCl FLUX FOR PURIFICATION OF AN ALUMINUM ALLOY PREPARATION

[75] Inventors: Jean Claude Béguin, Brussels, Belgium; Pierre Guérit, Chambery, France

[73] Assignee: Servimetal, Chambery, France

[21] Appl. No.: 725,556

[22] Filed: Sep. 22, 1976

[30] Foreign Application Priority Data

Sep. 26, 1975 [FR] France .................. 75 30276

[51] Int. Cl.$^2$ .................................. C22B 21/06
[52] U.S. Cl. .......................... 75/68 R; 75/93 AC; 75/257
[58] Field of Search ............. 75/68 R, 93 R, 93 AC, 75/257; 164/55, 56, 72

[56] References Cited

U.S. PATENT DOCUMENTS

| | | | |
|---|---|---|---|
| 3,246,374 | 4/1966 | Belcher | 164/72 |
| 3,517,727 | 6/1970 | Babel | 164/56 |
| 3,849,119 | 11/1974 | Bruno et al. | 75/68 R |

FOREIGN PATENT DOCUMENTS 990,125    4/1965    United Kingdom .............. 175/68 R

*Primary Examiner*—M. J. Andrews
*Attorney, Agent, or Firm*—Dennison, Dennison, Meserole & Pollack

[57] ABSTRACT

The invention relates to a preparation of aluminum and its alloys for purification by utilizing a flux composition of MgCl$_2$ and KCl to substantially remove alkali and alkaline earth metals, such as, Ca and Na, from the formulation of an aluminum preparation.

1 Claim, No Drawings

METHOD OF USING MgCl₂KCl FLUX FOR PURIFICATION OF AN ALUMINUM ALLOY PREPARATION

This invention relates to a flux composition for the removal of alkali and alkaline earth metals from a preparation of aluminum and aluminum alloys, and the processes for such removal by the flux composition of $MgCl_2$ and KCl. An aluminum preparation may contain deleterious alkali and alkaline earth metals in an alloy of aluminum and still further in the aluminum itself. These deleterious metals may be removed effectively by utilizing a $MgCl_2$ and KCl flux.

It is well known among metallurgists that certain alkali and alkaline earth metals can have unfavorable effects, even when present in very small quantities, upon the properties of lightweight and ultralightweight alloys. For example, sodium in a quantity of as low as 5 to 10 ppm considerably reduces the hot rollability of aluminum-magnesium alloys containing from 3 to 5% of magnesium.

Calcium, when present in quantities of greater than 150 ppm, adversely affects the smelting properties of eutectic and hypereutectic aluminum-silicon alloys to a considerable extent.

Now, so-called "initial fusion" aluminum, such as issues from electrolysis tanks, generally contains from 5 to 40 ppm of sodium and from 50 to 40 pm of calcium, the calcium content being capable of rising to several hundred ppm in aluminum-silicon alloys on account of the calcium content of commercial-grade silicon.

There are various methods for eliminating the sodium and calcium, such as chlorination or the use of fluxes based on fluorides. These methods are attended by the disadvantage that they involve the use of aggressive and polluting products (chlorine, fluorides) and cause a loss of magnesium in the form of $MgCl_2$ or $MgF_2$. In addition, the maintenance and running of chlorination installations involves numerous problems.

It is possible to limit pollution to an acceptable level and to eliminate the sodium and calcium by using magnesium chloride ($MgCl_2$) as flux. Unfortunately, $MgCl_2$ is highly hygroscopic and, once hydrated, decomposes under heat at the temperature of the molten aluminum into hydrochloric acid (HCl) magnesia (MgO) and/or magnesium oxychloride, which considerably reduces its effectiveness and involves losses in the form of slags.

In addition, its relatively high melting point (720° C) is another disadvantage because, to ensure adequate fluidity, it has to be heated to a temperature approaching 800° C and, in most cases, efforts are made to avoid heating aluminum to a temperature as high as this in order to save energy and to avoid risks of oxidation.

The object of the present invention is to obviate these disadvantages. According to my invention, the deleterious constituents (sodium, calcium in particular) are removed without any loss of magnesium by means of a flux which has a melting point lower than that of aluminum and which is substantially unaffected by atmospheric moisture. The flux according to the invention is a mixture of magnesium chloride and potassium chloride in a proportion by weight of from 80 to 60% of magnesium chloride and 20 to 40% of potassium chloride.

A flux such as this may be used by various known methods comprising, in particular, distributing the flux over the surface of the metal to be treated in melt form, accompanied by vigorous stirring either manually or by bubbling through an inert gas. However, as a still further object of my invention, I have found that it is more beneficial and effective to establish contact between the flux and the metal to be treated by any of the following three methods:

1. The mixture of magnesium chloride and potassium chloride in the proportions indicated above is melted in accordance with the invention, the resulting melt is poured into ingot molds so as to obtain, after cooling, compact blocks which have a relatively well-defined unit weight, for example 1 or 2 kg, are easy to handle and, by virtue of their smooth non-porous surface, do not give off any dust and are largely unaffected by atmospheric moisture during their handling. The blocks may be introduced into and kept below the surface of the molten metal to be refined by known method, such as the method in which a perforated graphite bell is lowered into the bath of molten metal to be treated. This method provides for slower and more progressive contacting of the flux with the metal and considerably reduces the volume of the fumes given off.

2. The mixture of magnesium chloride and potassium chloride in the proportions indicated above is melted in accordance with the invention and is introduced in the form of a liquid jet into the jet of metal to be treated in molten form either at the moment when it is cast from the melting furnace or at the moment when it is transferred from one ladle to another. This method provides for particularly effective contact between the flux and the metal to be treated.

3. Before the metal to be treated is cast, the base of the ladle is impregnated with the requisite quantity of flux. Since the flux is absorbed by the lining of the ladle, it is released relatively slowly to come into contact with the metal to be treated in melt form, which considerably lengthens its duration of activity. In addition, this third method may be combined with the first or with the second in order to increase its effectiveness.

EXAMPLE 1

An aluminum-magnesium alloy containing 4% of magnesium and 40 ppm of sodium (plus the other impurities normally found in this type of alloy) was heated to 730° – 750° C. A flux according to the invention consisting of 75% by weight of $MgCl_2$ and 25% by weight of KCl, in the form of a compact block obtained by melting the flux and casting it into ingot molds, followed by cooling, it introduced at the bottom of the ladle containing the liquid metal by means of a graphite bell in a quantity corresponding to approximately 2.5 kg per ton of alloy.

The reaction of the flux with the liquid alloy takes place smoothly with a very moderate release of fumes which the collector was able to absorb without difficulty.

After this treatment, the AlMg-alloy contained no more than 3 ppm of sodium.

EXAMPLE 2

An aluminum-magnesium alloy containing 4% of magnesium and 45 ppm of sodium, in addition to the other impurities normally found in this type of alloy, was heated to approximately 750° C in a melting furnace. In addition, a flux according to the invention containing 65% of $MgCl_2$ and 35% of KCl, in the form of grains, was distributed over the bottom of a preheated casting ladle in a quantity corresponding to 3 kg of flux per ton of alloy. The molten alloy was then cast into the ladle, producing effervescence and some fumes which were absorbed by the collector.

The metal thus treated had a final sodium content of 3 ppm.

EXAMPLE 3

A foundry alloy of the AS 13 type (aluminum base with 13% of silicon) containing 340 ppm of calcium and the impurities normally found in this type of alloy was treated by approximately 740° C, in the same way as in Example 1, by the introduction "with a bell" of 2 kg of flux in block form per ton of alloy, the composition by weight of the flux being as follows: $MgCl_2$ 78%, KCl 22%.

After this treatment, the alloy contained no more than 40 ppm of calcium without any adverse effect upon the mechanical properties of the castings of AS 13.

EXAMPLE 4

A foundry alloy of the AS 13 type, identical with that of Example 3, was cast on issuing from the melting furnace into a ladle of which the base had been previously impregnated with a flux consisting of 80% by weight of $MgCl_2$ and 20% by weight of KCl in a quantity corresponding to 1 kg per ton of metal to be treated. In addition, a jet of liquid flux heated to approximately 750° C and with the same composition as above was introduced during casting into the jet of metal to be treated which was also at a temperature of around 750° C. The quantity of flux thus cast amounted to approximately 2 kg per ton of metal to be treated.

After this treatment, the alloy contained no more than 30 ppm of calcium and less than 5 ppm of sodium.

The foregoing is considered illustrative only of the principles of the invention. Further, since numerous modifications and changes will readily occur to those skilled in the art, it is not desired to limit the invention to the exact embodiment described, and accordingly all suitable modifications and equivalents may be resorted to, falling within the scope of the invention.

What is claimed is:

1. A process for removing the sodium and calcium metals present in an aluminum-magnesium alloy consisting essentially of melting a flux containing from about 60 to 80% by weight of $MgCl_2$ and from about 40 to 20% by weight of KCl, distributing the flux in the form of grains over the bottom of a preheated casting ladle, whereby the flux is absorbed by the lining of the ladle, casting the aluminum-magnesium alloy in melt form into the ladle, purifying the cast aluminum-magnesium alloy by slow release of the flux in contact with the alloy, and recovering a purified aluminum alloy.

* * * * *